UNITED STATES PATENT OFFICE.

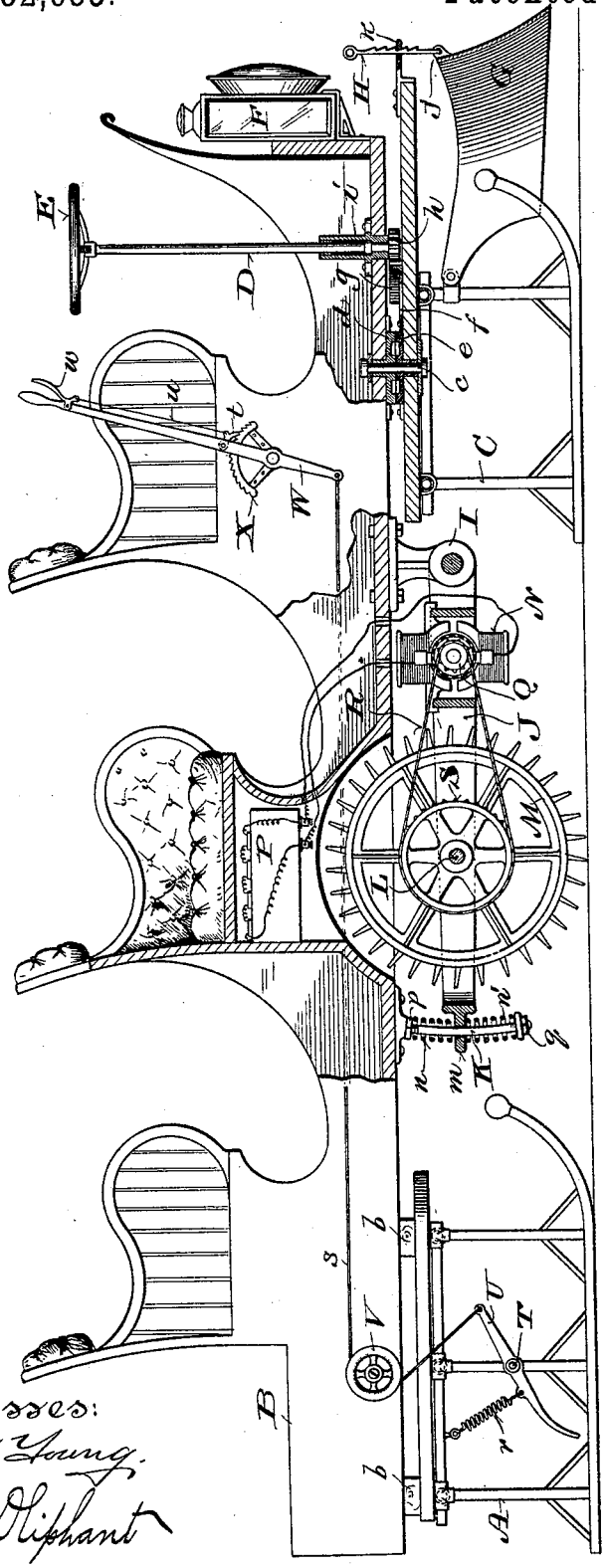

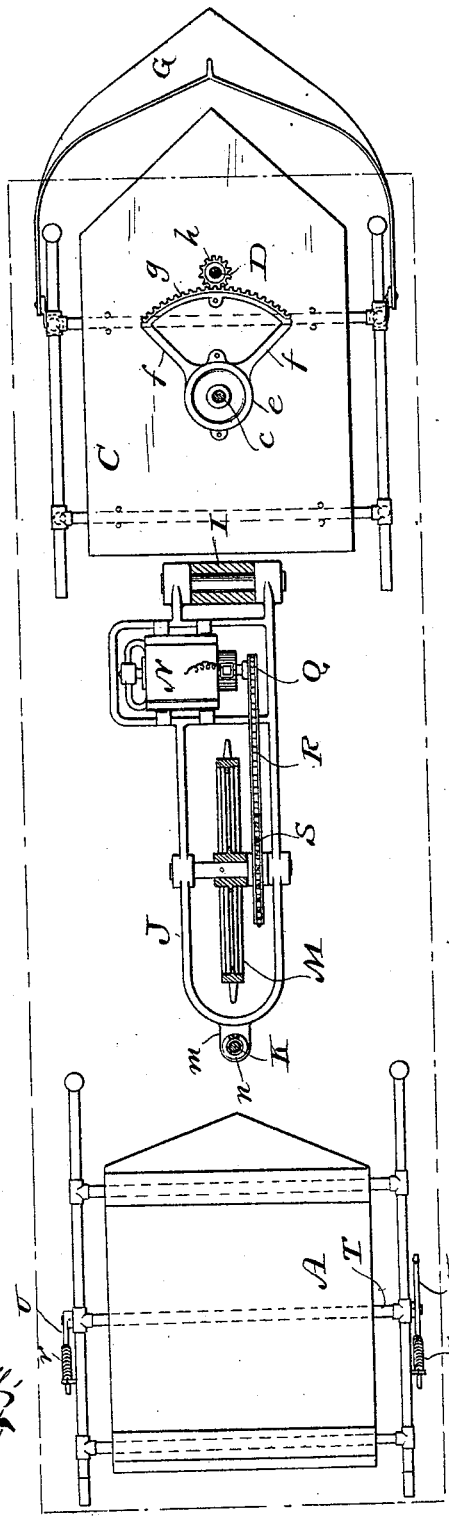

JOHN G. FRITZ, OF COLUMBUS, WISCONSIN.

SLEIGH.

SPECIFICATION forming part of Letters Patent No. 582,635, dated May 18, 1897.

Application filed December 30, 1896. Serial No. 617,454. (No model.)

*To all whom it may concern:*

Be it known that I, JOHN G. FRITZ, a citizen of the United States, and a resident of Columbus, in the county of Columbia and State of Wisconsin, have invented certain new and useful Improvements in Sleighs; and I do hereby declare that the following is a full, clear, and exact description thereof.

My invention has for its object to provide a simple, economical, and practical motor-sleigh; and it consists in certain peculiarities of construction and combination of parts hereinafter set forth with reference to the accompanying drawings and subsequently claimed.

Figure 1 of the drawings represents a motor-sleigh constructed according to my invention, the view being a side elevation, partly in section; and Fig. 2, a plan view of the running-gear, steering-gear, snow-fender, and brakes involved in said sleigh.

Referring by letter to the drawings, A represents a rear bob-sled provided with bolsters $b$ for a body B, having pivotal connection with a forward bob-sled C, the detail of this connection, as herein shown, being king-bolt $c$, engaging hub portions of circular plates $d$ $e$, that are respectively made fast to said body and forward bob-sled of the vehicle.

The circular plate $e$ is herein shown as a casting in one piece with a pair of radial arms $f$, connected by a toothed segment $g$, and a pinion $h$, fast on the lower end of a rod D, meshes with the teeth of said segment. The rod turns in a bearing $i$ on the body forward of the front seat therein shown, and by means of a crank or hand-wheel E said rod may be rotated to move the bob-sled C on its pivot and thereby steer the vehicle.

In front of its dashboard the body B of the vehicle is shown provided with a bracket for the support of a headlight F, and in pivotal connection with standards of the forward bob-sled is a triangular snow-fender G, having an ear $j$, connected to a toothed stem H, that extends through an eye in a plate $k$, made fast to the front upper portion of said bob-sled central of the latter, this stem being engaged with the plate to hold the snow-fender in the position to which it may be adjusted.

In pivotal connection with a hanger I on the bottom of body B is one end of a frame J, that has its other end provided with a rearwardly-extended apertured lug $m$ in play on a curved rod K, hung from said body. Spiral springs $n$ $n'$ surround the rod above and below the frame-lug $m$ and are herein shown as being adjustable in the matter of tension by means of nuts $p$ $q$, engaging screw-threads cut on said rod, whereby pivotal play of the aforesaid frame is regulated.

The frame is provided with bearings for the shaft L of a traction-wheel M, said shaft being in gear connection with a motor of any suitable type. An electric motor N is herein shown carried by the frame J and wired to a storage battery P, arranged under a seat of the vehicle out of the way, a sprocket-pinion Q, fast on the motor-shaft, being connected by a link belt R with a sprocket-wheel S, fast on the traction-wheel shaft L aforesaid.

The power of the motor drives the traction-wheel, and the spurs on the periphery of this wheel operate on the roadway to propel the vehicle, excess of snow in the path of said vehicle being cleared away by the fender in connection with the forward bob-sled. The traction-wheel being hung in a pivotal spring-controlled frame it will automatically adapt itself to inequalities in the surface over which it travels.

Standards of the rear bob-sled A are herein shown as provided with bearings for a rock-shaft T, and fast on the ends of this shaft are drag-arms U, normally held up out of contact with the surface over which the vehicle is propelled by means of spiral springs $r$, connecting them with said bob-sled. The upper ends of one of the drag-arms is shown connected to a flexible runner $s$, trained over a pulley V, that turns on a stud projecting from the vehicle-body, and said runner is made fast to the lower end of a hand-lever W in pivotal connection with said vehicle-body. A detent $t$, pivoted to the hand-lever, engages with a segmental rack X on the vehicle-body and has rod connection $u$ with a lifter $w$, also pivoted to said lever. By operating the lever W the shaft T may be rocked in its bearings against resistance of springs $r$ to bring the lower ends of the drag-arms U into play with the adjacent surface over which the vehicle travels, these drag-arms then serving as brakes for said vehicle.

Having thus described my invention, what

I claim as new, and desire to secure by Letters Patent, is—

1. The combination of a sleigh having a pivotally-adjustable steering portion, a hanger on the bottom of the sleigh-body, a frame having one end thereof in pivotal connection with the hanger, a curved rod depending from said sleigh-body and engaged with an apertured lug at the other end of the pivotal frame, spiral springs arranged on the rod above and below the frame-lug, and a motor-driven traction-wheel hung in said frame.

2. The combination of a sleigh having a pivotally-adjustable steering portion provided with a pivotally-adjustable snow-fender, a hanger on the bottom of the sleigh-body, a frame pivoted at one end to the hanger, a curved rod depending from said sleigh-body and engaged with an apertured lug on the other end of the pivotal frame, spiral springs arranged on the rod above and below the frame-lug, and a motor-driven traction-wheel hung in said frame.

3. The combination of a sleigh having a pivotally-adjustable steering portion, a hanger on the bottom of the sleigh-body, a frame having one end thereof in pivotal connection with the hanger, a curved rod depending from said sleigh-body and engaged with an apertured lug at the other end of the pivotal frame, spiral springs arranged on the rod above and below the frame-lug, a motor-driven traction-wheel hung in the frame, a rock-shaft provided with drag-arms, supporting-springs in connection with the drag-arms, a pulley-supported flexible runner connected at one end to one of the drag-arms, a lever connected to the other end of the runner, and pawl-and-ratchet mechanism for holding the lever in adjusted position.

In testimony that I claim the foregoing I have hereunto set my hand, at Columbus, in the county of Columbia and State of Wisconsin, in the presence of two witnesses.

JOHN G. FRITZ.

Witnesses:
G. W. STEPHENS,
G. H. STOFFEL.